United States Patent
Singh et al.

(10) Patent No.: US 11,934,979 B1
(45) Date of Patent: Mar. 19, 2024

(54) ONBOARDING OPTIMIZATION

(71) Applicant: Amazon Technologies, Inc., Seattle, WA (US)

(72) Inventors: Amritpal Singh, Glen Allen, VA (US); Deepak Sudhakar Pise, Redmond, WA (US); Ananth Gubbi Suryanarayana, Kirkland, WA (US); Praveen Parsa, Bellevue, WA (US); Mohamed Rizwan Puthiyaveettil Sharafudheen, Bellevue, WA (US); Sandeepkumar Racherla, Bellevue, WA (US); Shambhavi Mohan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 17/211,551

(22) Filed: Mar. 24, 2021

(51) Int. Cl.
*G06Q 10/0631* (2023.01)
*G06N 5/04* (2023.01)
*G06N 20/00* (2019.01)
*G06Q 10/1053* (2023.01)
*G06Q 30/0204* (2023.01)

(52) U.S. Cl.
CPC ....... *G06Q 10/063118* (2013.01); *G06N 5/04* (2013.01); *G06N 20/00* (2019.01); *G06Q 10/1053* (2013.01); *G06Q 30/0205* (2013.01)

(58) Field of Classification Search
CPC ....... G06Q 10/063118; G06Q 10/1053; G06Q 30/0205; G06N 20/00; G06N 5/04

USPC .......................................... 705/7.17
See application file for complete search history.

(56) References Cited

U.S. PATENT DOCUMENTS

| | | | |
|---|---|---|---|
| 2013/0097093 A1* | 4/2013 | Kolber | G06Q 10/1053 705/321 |
| 2014/0207509 A1* | 7/2014 | Yu | G06Q 10/1095 705/7.19 |
| 2015/0242819 A1* | 8/2015 | Moses | G06N 5/04 705/7.19 |
| 2018/0365656 A1* | 12/2018 | Mersereau | G06F 16/9536 |
| 2021/0133683 A1* | 5/2021 | Zhang | G06N 7/01 |

OTHER PUBLICATIONS

"Neural Network Based Psychometric Analysis for Employability", Thorat et al., 2018 (Year: 2018).*

* cited by examiner

*Primary Examiner* — Charles Guiliano
*Assistant Examiner* — Po Han Lee
(74) *Attorney, Agent, or Firm* — K&L Gates LLP

(57) ABSTRACT

Techniques are generally described for onboarding optimization for new hires. In various examples, labor order data specifying a target number of new hires may be received. In some examples, a first machine learning model may predict a number of new hire appointments to offer based at least in part on the labor order data. In further examples, an optimization component may allocate the number of new hire appointments to respective time slots based at least in part on candidate preferences. In some additional examples, data may be sent to a first application effective to display a list of available new hire appointment time slots of the respective time slots.

20 Claims, 7 Drawing Sheets

ONBOARDING OPTIMIZATION

BACKGROUND

Onboarding potential new hire employees in an environment with dynamically shifting labor requirements can be a daunting task. Scheduling of new hire appointments to fulfill current labor demand often needs to meet multiple labor, business, and/or staffing constraints and/or objectives. Additionally, accounting for candidate appointment preferences introduces an additional dimension to new hire appointment scheduling.

DETAILED DESCRIPTION

Figure 1:
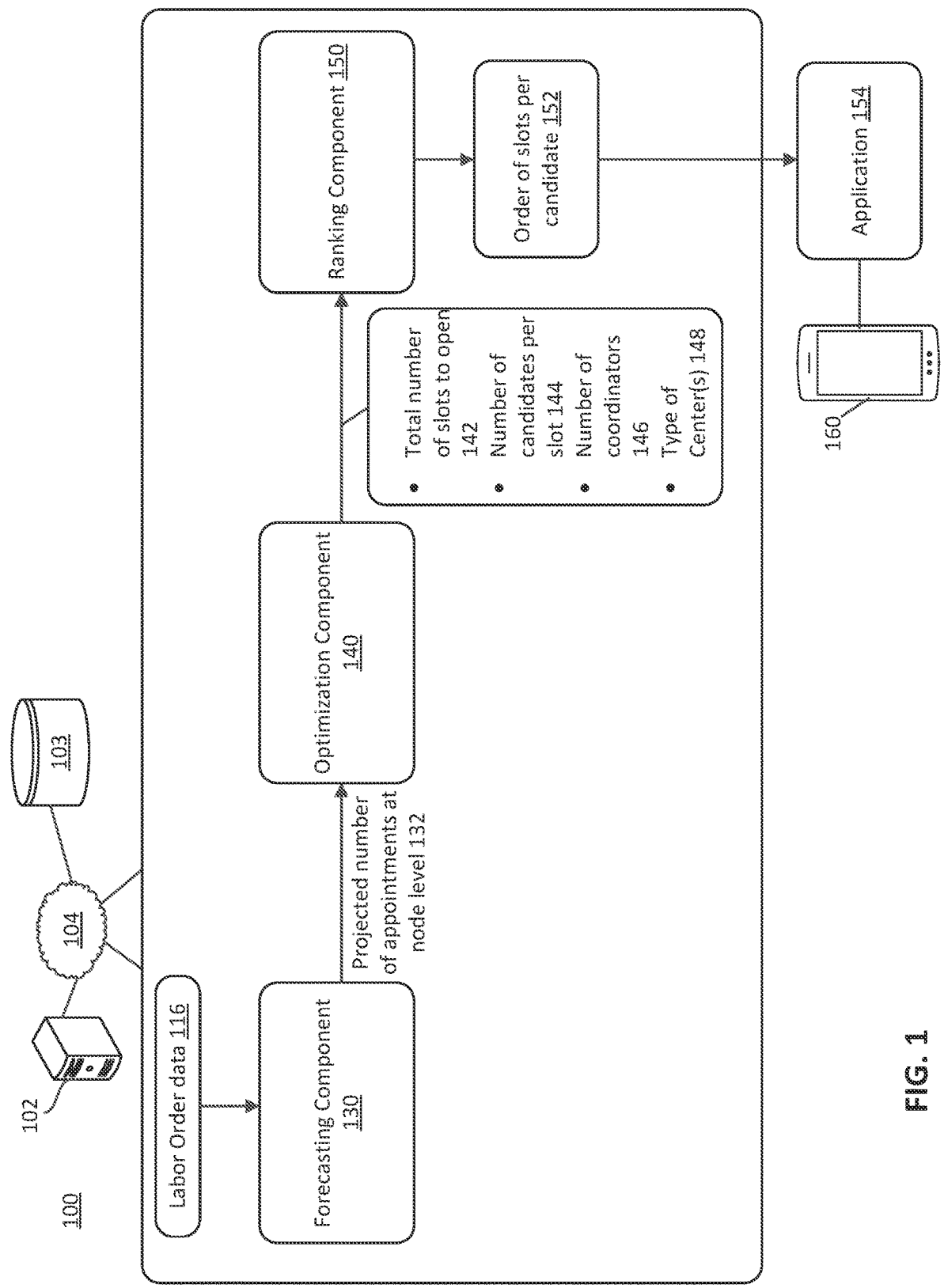
FIG. 1 is a block diagram showing an example system effective to optimize new hire appointments based on historical data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Large-scale fulfillment services may operate various distribution, warehouse, and/or sorting centers, which may be critical links in the supply chain. For example, fulfillment services operated by large-scale e-commerce services may include multiple sites within a particular marketplace (e.g., within the United States). In various examples, each of the sites may require from hundreds to thousands of employees to be hired every week in order to meet workload demands. In various examples, the high-volume hiring may be based fulfillment of labor order (LO) data for each of the sites every week. Labor order data may describe labor requirements at each of the sites for a given time period (e.g., per week, per month, etc.). Labor orders may be dynamic as they are the direct outcome of highly dynamic customer and/or business needs reverberating through the fulfillment service. Additionally, fulfillment of LOs may be required to meet multiple business constraints, human resource compliance constraints, regulatory constraints, and/or schedule preferences of candidates (e.g., prospective employees) to improve the likelihood of successful fulfillment of these LOs.

In some examples, the hiring process (e.g., a new hire process) may require candidates to schedule an appointment at a recruiting center or other physical site where candidates may be required to perform in person activities, such as provision of samples for drug testing, background checks, preparation of various forms, etc. While many on-boarding processes may be automated and performed remotely, drug testing (and/or other procedures) may require in person appointments. In various past examples, some organizations may have hosted such recruiting events at standard work hours (e.g., between Monday and Friday at each venue), with a set of event coordinators (e.g., new hire appointment coordinators) working throughout the day to process candidates arriving at these venues. In many examples, the entire process of conducting these recruiting events, starting from identifying the recruiting center venues and event dates, to staffing the appropriate number of event coordinators, opening up an appropriate number of new hire appointment timeslots for candidates, etc., was manual. The recruiting event processes often did not account for candidate preferences, resulting in suboptimal utilization of opened appointments. For example, in some cases, significant percentages of candidates may not have shown up to their scheduled appointments. Surveys conducted for candidates have revealed that non-availability of favorable appointment time slots was often the primary reason for candidate no-shows.

To address such issues, described herein are data science-driven systems and techniques for automatic generation of appointment time-slots for each recruiting venue, where the appointment time-slots are optimized for candidate preferences. The various systems and techniques described herein employ machine learning models to identify the most favorable appointment time-slots based on historical data indicating candidate propensities and/or past candidate selections of new hire appointment time slots. For example, historical data may represent past labor order data and/or past slot fulfillment for the past labor order data (among other things described herein). In addition, the various systems and techniques described herein recommend the optimal staffing of event coordinators by hour, while respecting the physical constraints of the particular recruiting site (e.g., the venue).

In various examples described herein, new hire appointments refer to in-person appointments scheduled for new hire candidates. In some examples, new hire candidates may have contingent offers of employment, contingent on passing a drug test and/or meeting other requirements that may be verified at the new hire appointments (or using samples provided at the new hire appointments). The various systems and techniques described herein may replace pen and paper approaches and manual calculation which may be unable to keep pace with the rapidly fluctuating hiring needs of large scale companies. The machine learning (ML) algorithm described herein may be completely automated to handle the new hire appointment scheduling issue and may have the flexibility to scale up as per the current hiring demands. Moreover, the machine learning algorithm may remove the human judgement and manual entry bias from the equation to optimize the scheduling of new hire appointments based on candidate preferences.

Rather than working backward from Labor Orders to calculate the number of staff required to process candidates, existing tools and processes accept, as an input, the number of staff available or required. Without closed-loop measurement systems, there may be no mechanism to quantify the impact of insufficient staff on show rate or candidate throughput. While the current processes are heavily steered toward coordinator experience, the various machine learning systems and techniques described herein focus on both coordinators and candidates to optimally recommend the new hire appointments. In various examples, the machine learning model may be trained on both long term (e.g., multiple years worth) of historical data along with recent labor order/new hire appointment trends. Accordingly, the model may be intelligent enough to take care of the market variances at different geographies, may learn over time and may continuously be improved to recommend better candidate timeslots.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram showing an example system 100 effective to optimize new hire appointments based on historical data, arranged in accordance with various aspects of the present disclosure. In various examples, system 100 may be implemented by one or more computing devices 102 that may be configured in communication over a network 104. Network 104 may be a communication network such as a local area network (LAN), a wide area network (such as the Internet), or some combination thereof. The one or more computing devices 102 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

System 100 may be effective to receive labor order data 116. Labor order data 116 may specify a target number of new hires. In various examples, the labor order data 116 may specify the target number of new hires for each site of one or more sites. For example, for a coming time period, a first site may require 100 new hires in order to meet its labor needs, while a second site may require 200 new hires. In such an example, the labor order data 116 may specify that the first site requires 100 new hires and that the second site requires 200 new hires to meet the anticipated labor demands of each site.

In various examples, the forecasting component 130 may receive labor order data 116 specifying the new hire target numbers, per-site, for an upcoming time period (e.g., the next week, the next month, etc.). The forecasting component 130 may be a machine learning model (e.g., a neural network, a regression based model, etc.) that may be effective to determine a projected number of appointments at the node level 132. A node may include multiple sites in various examples. As described in further detail below, in various implementations, forecasting component 130 may take other forms of input besides labor order data 116. Forecasting component 130 is described in further detail below in reference to FIG. 2. The projected number of appointments at node level 132 may, in turn, be input into optimization component 140.

Optimization component 140 may be another machine learning model (e.g., a neural network, regression-based model, etc.) that may receive the projected number of appointments at node level 132 as input and may output the total number of slots to open 142, an assignment of a number of candidates per slot 144, a number of coordinators 146 (e.g., per site), a type of center(s) 148 (e.g., a size of recruitment center, etc.). In various examples, in addition to the projected number of appointments at node level 132, the optimization component 140 may also take other forms of input. For example, the optimization component 140 may take historical show rate data (e.g., the percentage of new hire appointments that were fulfilled at a given site), past arrival pattern data (e.g., time series data indicating time-stamped arrivals of new hire candidates at past new hire appointments), cost data associated with recruitment center overhead and new hire coordinators, lunch hour and/or meeting data of coordinators that may make render a particular time slot unsuitable for new hire appointments, etc. The optimization component 140 is described in further detail below in reference to FIG. 3.

The various outputs from optimization component 140 (e.g., total number of slots to open 142, an assignment of a number of candidates per slot 144, a number of coordinators 146 (e.g., per site), a type of center(s) 148, etc.) may be input into a ranking component 150. Ranking component 150 may be a learning to rank (LTR) model that may use supervised, semi-supervised, or reinforcement learning to learn to rank the available new hire appointment time slots (e.g., output by optimization component 140) according to candidate preferences (e.g., candidate-specified preferences) in order to display an optimized and ranked list of new hire appointment time slots for which new hire candidates may sign up. Accordingly, ranking component 150 may output an order of slots per candidate 152. System 100 may send data representing the ranked available new hire appointment time slots for display by a companion application 154 (e.g., a mobile application configured to execute on mobile devices such as mobile device 160).

The ranking component 150 may receive various inputs such as data identifying a particular candidate (or class of candidate), a commute distance of the candidate (e.g., to the prospective work site), recruitment center details, past candidate preferences, current candidate preferences, etc., in order to generate a ranked list of new hire appointment time slots (e.g., order of slots per candidate 152) that is personalized for a candidate. Ranking component 150 is discussed in further detail below in reference to FIG. 4.

Figure 2:
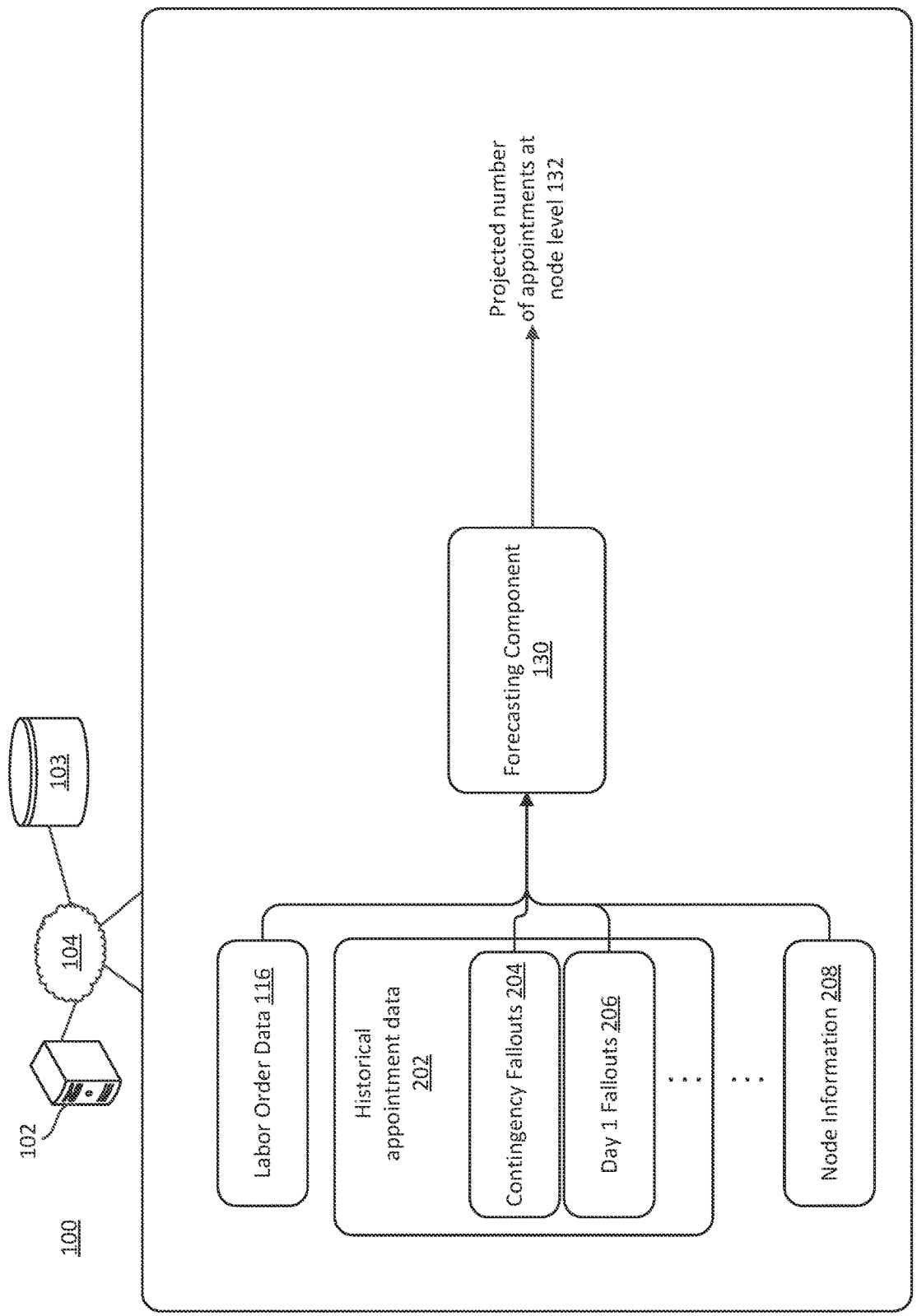
FIG. 2 is a block diagram illustrating an example of a forecasting component effective to predict a number of appointments to offer based on a variety of data, in accordance with various aspects of the present disclosure.

FIG. 2 is a block diagram illustrating an example of a forecasting component 130 effective to predict a number of appointments to offer based on a variety of data, in accordance with various aspects of the present disclosure. The forecasting component 130 may be a scalable predictive algorithm that may forecast the number of appointments needed at the node level in order to fulfill the input labor order. The forecasting component 130 may predict both the per-site number of new hire appointments needed to fulfill the labor order and the total number of new hire appointments required for at the node level (e.g., where a node comprises at least one site). The total projected number of appointments at the node level 132 may be sent to the optimization component 140 for timeslot allocation, as described in further detail below. For example, the forecasting component may predict that 300 new hire appointment slots should be opened for site ABC1 and that 200 new hire appointment slots should be opened for site ABC2 in order to fulfil the LO (represented by labor order data 116). Therefore, for the node ABC, 500 new hire appointments should be opened. This projected number of appointments at node level 132 may be sent to the optimization component 140 for allocation to time slots.

In addition to labor order data 116, historical appointment data 202, data representing contingency fallouts 204 (e.g., historical contingency fallout data indicating candidate fallouts (e.g., candidates quitting and/or terminating the hiring process at various stages) such as data representing historical "Day 1" fallouts 206), data representing node information 208, etc., may be input into the forecasting component 130 and may be used to predict the projected number of appointments at node level 132. Node information 208 may include information about how difficult the node has historically been to attract candidates. For example, some geographical nodes may have a history of attracting new hire candidates relatively easily. In such cases, such nodes may require a lesser number of new hire appointments to meet their onboarding needs relative to a node that has been historically difficult in terms of attracting new hire candidates. Accordingly, node information 208 may classify the relative ease (or difficulty) of attracting candidates for a given node. Historical appointment data 202 may indicate past new hire appointments for a past labor order and may indicate whether or not those appointments were fulfilled. Data representing contingency fallouts 204 may be historical fallout data indicating those candidates receiving contingent offers for employment that dropped out (e.g., a new hire fallout) after receiving a contingent offer, but before starting work or before attending a new hire appointment. Similarly, data representing Day 1 fallouts 206 may be historical fallout data indicating those candidates that dropped out after the new hire appointment and/or after a short period of work (e.g., after a single day or a single week). For example, data representing Day 1 fallouts 206 may be a percentage of new hire fallouts occurring after commencement of employment. Node information 208 may be data identifying the particular node in order to relate the various historical data to the node at issue. Various other inputs to the forecasting component 130 are described below.

In various examples, the forecasting component 130 may be implemented as a linear regression model. However, other machine learning techniques may be used to implement the forecasting component 130. For example, the forecasting component 130 may be implemented as a neural network, a tree based model, etc.

An example implementation where the forecasting component is implemented as a linear regression model is described below. Linear Regression is a method for modeling a relationship between a dependent variable and independent variables. Multiple linear regression attempts to model the relationship between two or more explanatory variables and a response variable by fitting a linear equation to observed data. Every value of the independent variable x is associated with a value of the dependent variable y. The population regression line for p explanatory variables $x_1$, $x_2, \ldots x_p$ may be defined to be $$\mu_i = \beta_0 + \beta_1 X_1 + \beta_2 X_2 + \beta_3 X_3 + \ldots + \beta_p X_p$$

This line describes how the mean response p y changes with the explanatory variables. The observed values for y vary about their means μ y and are assumed to have the same standard deviation G. The fitted values $b_0, b_1, \ldots b_p$ estimate the parameters $\beta_0, \beta_1, \ldots \beta_p$ of the population regression line. Since the observed values for y vary about their means $\mu_y$, the multiple regression model includes a term for this variation. In words, the model is expressed as DATA=FIT+RESIDUAL, where the "FIT" term represents the expression $\beta_0 + \beta_1 X_{i1} + \beta_2 X_{i2} + \beta_3 X_{i3} + \ldots + \beta_p X_{ip}$. The "RESIDUAL" term represents the deviations of the observed values y from their means $\mu_y$, which are normally distributed with mean 0 and variance G. The notation for the model deviations is $\epsilon$.

Formally, the model for multiple linear regression, given n observations, is $$Y_i = \beta_0 + \beta_1 X_{i1} + \beta_2 X_{i2} + \beta_3 X_{i3} + \ldots + \beta_p X_{ip} + \epsilon_i \text{ for observation } i=1,2,\ldots n$$

In the formula above n observations of one dependent variable and p independent variables are considered. Thus, $Y_i$ is the $i^{th}$ observation of the dependent variable, $X_{ij}$ is $i^{th}$ observation of the $i^{th}$ independent variable, j=1, 2, . . . , p. The values represent parameters to be estimated, and $\epsilon_i$ is the $i^{th}$ independent identically distributed normal error. These models can be fit with numerous approaches.

In the least-squares model, the best-fitting line for the observed data is calculated by minimizing the sum of the squares of the vertical deviations from each data point to the line (if a point lies on the fitted line exactly, then its vertical deviation is 0). Because the deviations are first squared, then summed, there are no cancellations between positive and negative values.

The values fit by the equation $b_0 + b_1 x_{i1} + \ldots + b_p x_{ip}$ are denoted $y_i$, and the residuals $\epsilon_i$ are equal to $y_i - y_i$, the difference between the observed and fitted values. The sum of the residuals is equal to zero.

The variance $\sigma^2$ may be estimated by $$s^2 = \frac{\sum e_i^2}{n - p - 1}$$

also known as the mean-squared error (or MSE). The estimate of the standard error s is the square root of the MSE.

In various examples, the forecasting component 130 (implemented using a multiple regression model) may use the following attributes:

| Variable Name | Description | Variable Type |
|---|---|---|
| Labor Order | Total Labor order at node level | Independent variable |
| NumOfHiredApplications_Day1 | Number of hired candidates in the given hiring week per site | Independent variable |
| TotalApplications | Total number of applications received in the given hiring week per site | Independent variable |
| TotalApt1 | Total number of appointment1 booked in the given hiring week per site | Dependent variable |
| SucessApt1 | Total number of successful appointment 1 in the given hiring week per site | Independent variable |
| TotalApt4 | Total number of appointment 4 booked in the given hiring week per site | Independent variable |
| SucessApt4 | Total number of successful appointment 4 in the given hiring week per site | Independent variable |
| Node | Node for the analysis | Independent variable |
| RatioDay1_TotalApt1 | Ratio of NumOfHiredApplications_Day1 to TotalApt1 | Independent variable |
| RatioDay1_SucessApt4 | Ratio of NumOfHiredApplications_Day1 to TotalApt4 | Independent variable |
| RatioSucessApt4_SucessApt1 | Ratio of SuccessApt4 to successApt1 | Independent variable |
| RatioSucessApt1_TotalApt1 | Ratio of SuccessApt1 to totalApt1 | Independent variable |
| RatioSucessApt4_TotalApt4 | Ratio of SuccessApt4 to totalApt4 | Independent variable |
| RatioTotalApt1_TotalApplications | Ratio of totalApt1 to TotalApplications | Independent variable |

Through the multiple linear regression analysis, it was checked whether or not the independent variables (mentioned above) in the model were significantly predictive of total appointments ('TotalApt1'), which was the dependent variable, according to the P-values. In addition, the forecasting component 130 may use data quantifying seasonality effects (e.g., a season in which an increased and/or reduced workload is anticipated based on historical data), the number of appointments to offer based on incentives offered (e.g., signing bonuses, benefits, etc.), data quantifying current market conditions, etc.

Outlier Detection

In various examples, extreme values and/or noise may be removed from the data. For example, outlier detection may be used to clean the data of such noise/extreme values. For example, all weeks that exhibit the below relationship may be removed:

All the weeks where
1) Total Number of Applications<Labor Order
2) Total Appointment 1 booked/LO<2*Average (Total Appointment 1 booked/LO)

Forecast Appointments Booked to Open

In various examples, the forecasting component 130 may predict the total appointments booked for a given LO. The total appointments booked are scaled up to total appointment open to give candidates more choices in the week to schedule/reschedule the appointment. In an example, a historic 6 week moving average may be used with a ratio of total appointments opened and total appointments booked used as scale up factor.

After the forecasting component 130 algorithm is run, the projected number of appointments to schedule at the node level is generated. This total number of appointments is sent as an input to the optimization engine for timeslot creation. Below is a sample output for a particular node. For the node level LO of 200, forecasting engine predicted 1556 appointments to schedule to fulfill the given labor order.

```
{
    "forecastPayload": [
        {
            "hiring_week_date": "2021-03-14",
            "hiring_week_number": 11,
            "appt_week_start date": "2021-02-28",
            "appt_week_end_date": "2021-03-06"
            "node": "SLC",
            "node_level_lo": 200,
            "fe_booked_pred": 1556,
        }
    ]
}
```

Figure 3:
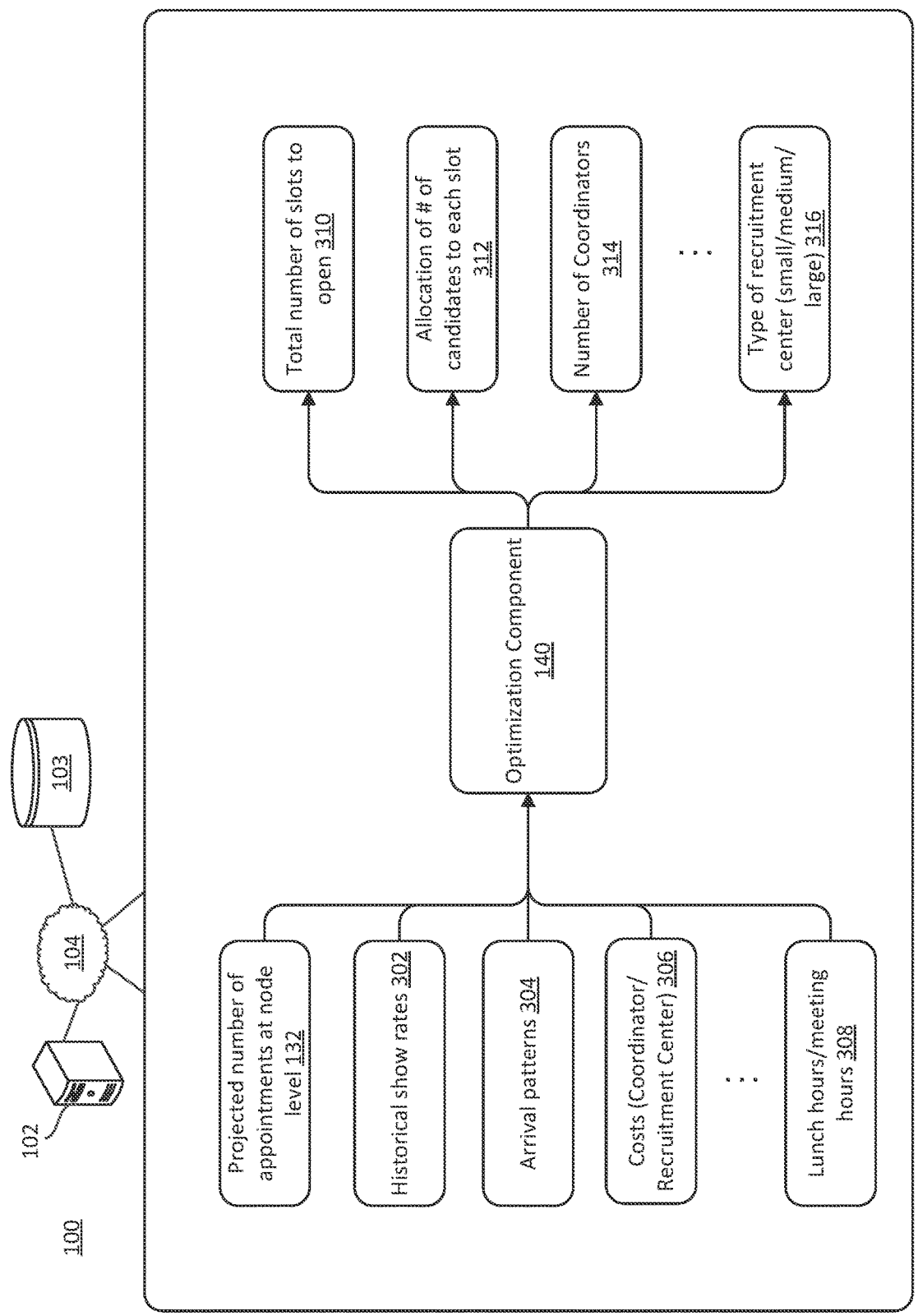
FIG. 3 is a block diagram illustrating an example of an optimization component effective to determine a number of appointment slots and allocate candidates to appointment slots, in accordance with various aspects of the present disclosure.

FIG. 3 is a block diagram illustrating an example of an optimization component 140 effective to determine a number of appointment slots and allocate candidates to appointment slots, in accordance with various aspects of the present disclosure.

Optimization component 140 may take as input the projected number of appointments at the node level 132 (e.g., as output by the forecasting component 130), data indicating historical show rates 302, data indicating candidate arrival patterns 304, data indicating costs 306 (e.g., costs associated with the recruiting centers and/or staffing of recruiting coordinators), data indicating lunch hours/meeting hours 308 (and/or other times at which new hire appointments may not be scheduled due to conflicts). Historical show rates 302 may be, for example, the percentage of new hire appointments that were fulfilled at a given site and/or at the given node. Arrival patterns 304 may be, for example, time series data indicating time-stamped arrivals of new hire candidates at past new hire appointments, costs 306 may be the costs associated with staffing and/or recruiting center overhead, lunch hours/meeting hours 308 may indicate times and/or dates at which no new hire appointments may be held.

In various examples, optimization component 140 may be effective to solve an optimization problem to maximize candidate show rates for available new hire appointments based on multiple constraints (e.g., based on historical show rates 302, projected number of appointments at node level 132, arrival patterns 304 (and/or associated requirements) costs 306, lunch hours/meeting hours 308, etc. The optimization component 140 may allocate appointments to timeslots based on candidate propensities for arrival (e.g., based on arrival patterns 304 and historical show rates 302). The optimization component 140 generates the number of slots 310 to open (e.g., in a given week) and an allocation of the number of candidates to be allocated to each slot 312. Additionally, in various examples, the optimization component may outputs the number of coordinators 314 required during the week to process the new hire appointments. Further, in some examples, the optimization component 140 may output the type of recruitment centers to open (e.g., from among recruitment centers classified as small, medium, large, etc.). In an example, the optimization component 140 may schedule the 500 open slots across the week based on candidate show rates for the node ABC and recommend two recruitment centers and five coordinators for processing the new hire appointments. In various examples, coordinators may be able to override the appointments selected by one or more candidates.

The optimization component 140 may take the node level appointments as input from the forecasting component 130, candidate historical show rates and arrival patterns data, and lunch/meeting hours from coordinators as inputs to generate the number of slots to open in a given week and how many candidates to allocate for each slot. Additionally, it also outputs the number of coordinators required during the week to process the appointments and the type of recruitment centers to open. For example, the optimization component 140 may schedule the 1556 open slots across the week based on candidate show rates for the particular node and may recommend two recruitment centers and five coordinators to process the candidate appointments.

The inputs to the optimization component 140 may include: 1) the number of different recruitment centers and types of recruitment centers associated with each node; 2) the number of appointments to be opened during the week (e.g., from the forecasting component 130); and 3) information for each venue based on analysis of previous new hire events. The information in 3) may include candidate throughput rates for various staffing configurations (e.g., data indicating throughput for minimal staff vs. a recruiting center classified as "small" vs. a recruiting center classified as "large," etc.). Additional inputs to the optimization component 140 may include weather condition data (e.g., recent and/or forecasted weather conditions), geographical practices, etc.

The optimization component 140 may be predicated on the assumption that slot propensity scores across different recruitment centers for each node are the same. The cost of hiring each coordinator for the week is minimum slot propensity score.

Maximizing Function for Optimization Component 140

To create a maximizing function, slot propensity scores are defined. To create the slot propensity score, show rates for appointments across the week (or other relevant time period) as well as how these appointments are distributed are considered. This ensures that timeslots with the highest show rates and appointments are selected. Since the coordinators open the recruitment center for consecutive time slots throughout the day, appointments are set up in consecutive time slots. Accordingly, the time slots are clustered based on the day, the time, and how close the slot propensity scores are to one another. Once the time slots are clustered, the clusters are included as the open hours for creating appointments. Additionally, the number of coordinators needed to process the candidates is minimized.

Outputs/Decision Variables of Optimization Component 140

The number of appointment slots to open each timeslot/cluster is determined (e.g., the total number of slots to open 310 and the allocation of the number of candidates to each slot 312). Additionally, the number of coordinators that are needed to process these candidates for each recruitment center is determined (e.g., number of coordinators 314 and type of recruitment center(s) 316).

Optimization Problem Constraints

1) The maximum number of candidates that can be processed by the coordinators should be less than or equal to the maximum capacity of the venues.
2) The number of candidates to be scheduled during a particular time slot/cluster should be less than or equal to the maximum number of candidates that can be processed by the coordinators.
3) The optimal number of coordinators for each venue should be less than or equal to the staffing constraints for each venue.
4) The total number of appointments to be open during the week should be less than or equal to the forecasted number of appointments to be scheduled.

Maximizing Function $$+\Sigma C_{ij} \times SR + -\Sigma P_{ij} \times \text{num\_hours}_i \times \text{Cost\_Coord} - \Sigma V_{ij} \times \text{num\_hours}_i \times \text{Cost}_{venue}^j$$

Where
$i = \{1, 2, 3 \ldots 56\}$ clusters of slots
$j = \{\text{minimal staff, small RC, large RC, XL RC}\}$ venue
Slot Rate (SR) = $\mathcal{F}$ (Show Rate, Touched Rate)
Show Rate = Successful Appt in the time slot ÷ Total Appts in the time slot
Arrival Rate = Successful Appts in the time slot ÷ Total Successful Appts during the week
num_hours = number of hours in each cluster
Cost_Coord = −min(positive SR)

Subject to:

$$P_{ij} \times hc_{hr_j \times num\_hours_i} \leq V_{ij} \times \text{venue}_{capacity_j \times num\_hours_i} \times \text{daily\_capacity} - \text{Booked\_Appts}_i$$

$C_{ij} \leq P_{ij} \times \text{cand\_hc\_hr}_j \times \text{num\_hours}_i$
$P_{ij} \leq \text{staff}_{size_j}$
$V_{ij} \leq \text{is\_opened}$
$V_{ij} \leq \text{is\_day\_opened}$
$P_{ij} \geq \text{minstaff} * V_{ij}$
$\Sigma P_{ij} \leq \text{max\_node\_coord}$
$\Sigma C_{ij} \leq \text{total\_appt\_schedule} - \text{Booked\_Appts}$ Where:
$i = \{1, 2, 3 \ldots 56\}$ clusters of slots
$j = \{\text{minimal staff, small RC, large RC, XL RC}\}$ venue type
hc_hr is Capacity/Hour
cand_hc_hr = Candidates/HC/Hour
num_hours = number of hours in each cluster
num_venues = total (true) number of venues of each type j
staff_size = maximum staffing capacity of the venue
is_opened = 1 is the venue open
is_day_opened = is the day of the week open/still open
daily_capacity = can we staff 100% or less
min_staff = min staff needed at a venue to conduct an event
max_node_coord = max num of coordinators we can have at a node
Booked_Appts = previously booked appts for the week (usually for rollover LOs and rerun of optimization during the week Decision Variables:
1) Number of candidates that are processed for each clustered time slot and venue:

$$\Sigma_{i=1}^{56} C_{ij} \text{ where } i = \{1, 2, 3 \ldots 56\} \text{ cluster slots}$$

2) Total number of coordinators required for each venue for each clustered time slot $$\Sigma_{j=venue\_type} P_{ij} \text{ where } j = \{\text{minimal staff, small RC, large RC, XL RC}\}$$

3) For each venue, is it open or not (binary)

$$\Sigma_{i=venue\_type} V_{ij} \text{ where } j = \{\text{minimal staff small RC, large RC, XL RC}\}$$

Costs Used in Maximizing Criteria:
Coordinator cost=min of slot propensity score
Venue Costs:
Minimal=min of slot propensity score
Small=mean of slot propensity score
Large=2*mean of slot propensity score
Extra Large (XL)=4*mean of slot propensity score
Multiroom=4*mean of slot propensity score
Defining Appointment Slot Propensity Scores To define the appointment slot propensity score, the timeslots are considered which have the maximum number of successful appointments as well as the slots with maximum number of appointments (including no shows and cancelled) selected by the candidates. The first part focuses on true successful appointments that were conducted, and the second part focuses on potential of successful appointments as it includes time slots where candidates believed they would be able to attend, but did not due to various circumstances (unsuccessful appointments). This is normalized by the total number of appointments opened in a timeslot, as the total number of successful appointments is directly proportional to the number of open slots.

The appointment slot propensity score is defined as below:

$$SlotRate_i = \sum\nolimits_{across\ weeks} \left(\frac{S_i}{B_i} \times \frac{T_i}{O_i}\right) \bigg/ \left(\frac{\sum_i^n S_i}{\sum_i^n B_i} \times \frac{\sum_i^n T}{\sum_i^n O_i}\right)$$

Where:
$S_i$=#successful appts in time slot i
$B_i$=#booked appts in time slot I (successful, no shows)
$T_i$=#booked appts in time slot I (successful, no shows, cancelled)
$O_i$=#opened appts in time slot i
i={1, 2 . . . 56} time slots Various clustering methodologies may be used. For example, predefined clusters (one in which timeslots are predefined), k-means clustering, hierarchical clustering, etc.

Figure 4:
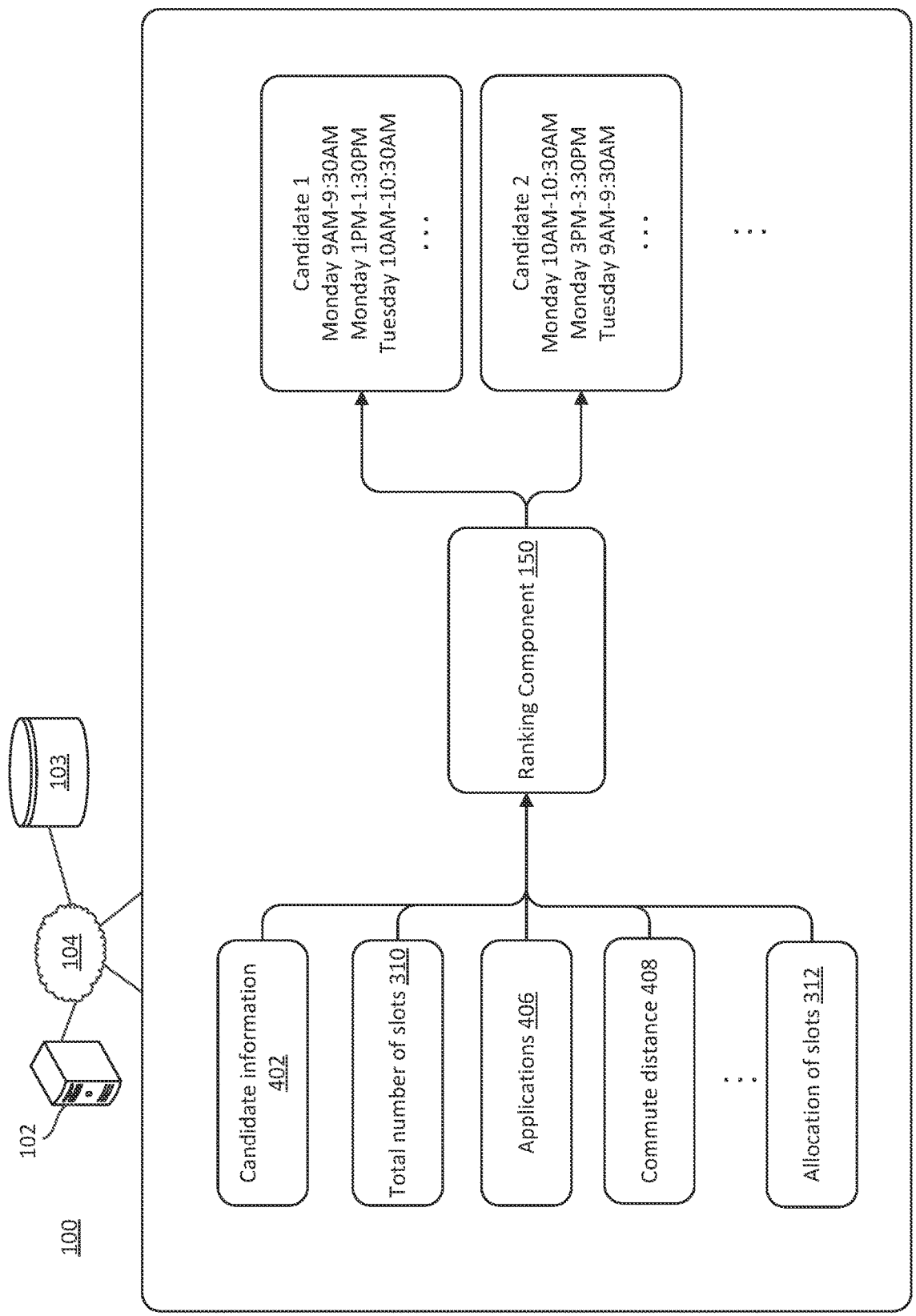
FIG. 4 is a block diagram illustrating an example of a ranking component effective to rank time slot offerings for new hire appointment per-candidate, in accordance with various aspects of the present disclosure.

FIG. 4 is a block diagram illustrating an example of a ranking component 150 effective to rank time slot offerings for new hire appointment per-candidate, in accordance with various aspects of the present disclosure. Ranking component 150 may be, for example, a a learning to rank (LTR) model that may use supervised, semi-supervised, or reinforcement learning to learn to rank the available new hire appointment time slots (e.g., output by optimization component 140) according to candidate preferences in order to display an optimized and ranked list of new hire appointment time slots for which new hire candidates may sign up. In various examples, ranking component 150 may take candidate information 402, total number of slots 310 (e.g., available new hire appointment slots), applications 406, commute distance 408, the number of candidates to be allocated to each slot 312 (e.g., output by optimization component 140), etc., as input.

Candidate information 402 may include various information about individual candidates. For example, candidate information 402 may include candidate preferences for new hire appointments, candidate commute information (e.g., the candidates' addresses), times/dates at which the candidate is unavailable, etc. Total number of slots 310 may include the number of new hire appointment slots to be opened in the relevant week (e.g., based on the labor order data 116. The total number of slots 310 may be output by the optimization component 140. Applications 406 may include application data provided by candidates for employment. In some examples, the applications 406 may include the candidate information 402. Commute distance 408 may be data identifying the commute distance for a candidate. In some examples, the commute distance may be determined using candidate information 402 an/or applications 406. Allocation of the number of candidates to be allocated to each slot 312 may be used to determine whether or not a particular slot should be highly ranked for a candidate. A particular schedule of appointment options may be output for a particular candidate based on similarity of that candidate to past candidates that are similar to that candidate (e.g., as determined using candidate information 402, applications 406, commute distance 408, etc.).

The ranking component 150 may take timeslots from the optimization component 140 as input and determines the order of slots displayed to the candidate in the application 154's appointments page. Ranking component 150 may use information related to candidate, application, commute distance, available appointments, and event center details for precise recommendations to personalize for the candidate. The algorithm may generate a pre-curated offline list of candidate profiles based on the output of the optimization component 140 at a node level. The appointments suggested at the candidate selection level will be specific to the site they have selected in the application 154. The ranking component 150 may recommend an appropriate ranked list of appointment time slots to the candidates (in real-time) based on the job that candidate has selected during shift selection, available appointments from each event center, historical appointment show rates and the candidate's address. For example, based on candidate X's site specific selection (candidate X applied to node ABC1) and proximity to a recruitment center (time, commute, etc.), the ranking component 150 may suggest Monday morning 9-11 am and Tuesday morning from 11 am-1 pm. For another candidate Y that applied to ABC1 and located closer to another recruitment center, the algorithm may suggest the other available closest recruitment center as the venue and some other time slots.

The ranking component 150 may output a per-candidate ranked list of available new hire appointments, as shown in FIG. 4. For example, for candidate 1, a new hire appointment slot from 9-9:30 AM on Monday is the top-ranked new hire appointment, followed by Monday from 1-1:30 PM, followed by Tuesday from 10-10:30 AM, etc. However, for candidate 2, the top-ranked new hire appointment slot may be from 10-10:30 AM on Monday, followed by 3-3:30 PM on Monday, followed by 9-9:30 AM Tuesday, etc. In various examples, the output data representing the per-candidate ranked list of new hire appointment slots may be sent to a companion application accessible by new hire candidates. The companion application may be effective to schedule the appointments and keep track of what new hire appointment slots have been filled (and are thus no longer available). Additionally, data indicating candidate selection (and non-selection) of various new hire appointment slots may be used as historical data that may be used to update machine learning models of the forecasting component 130, the optimization component 140, and/or the ranking component 150 to improve the output of the system 100.

Figure 5:
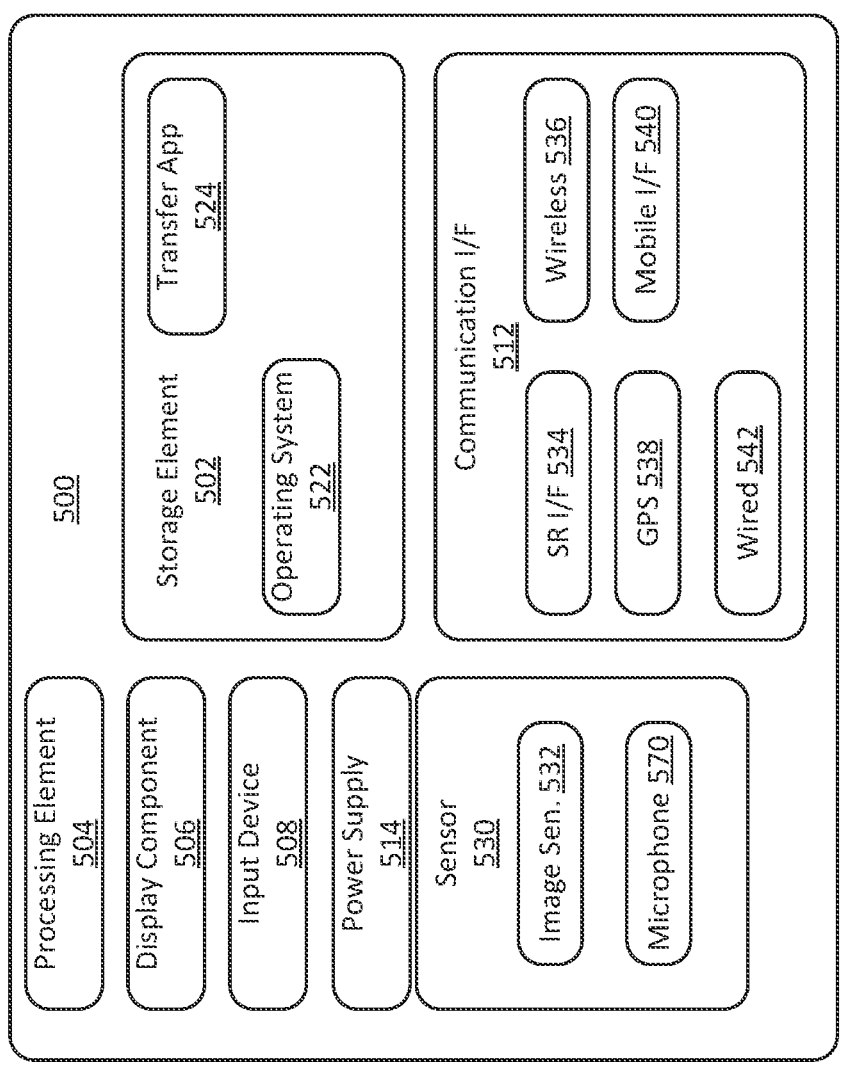
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the forecasting component 130, the optimization component 140, and/or the ranking component 150 described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, imaging radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
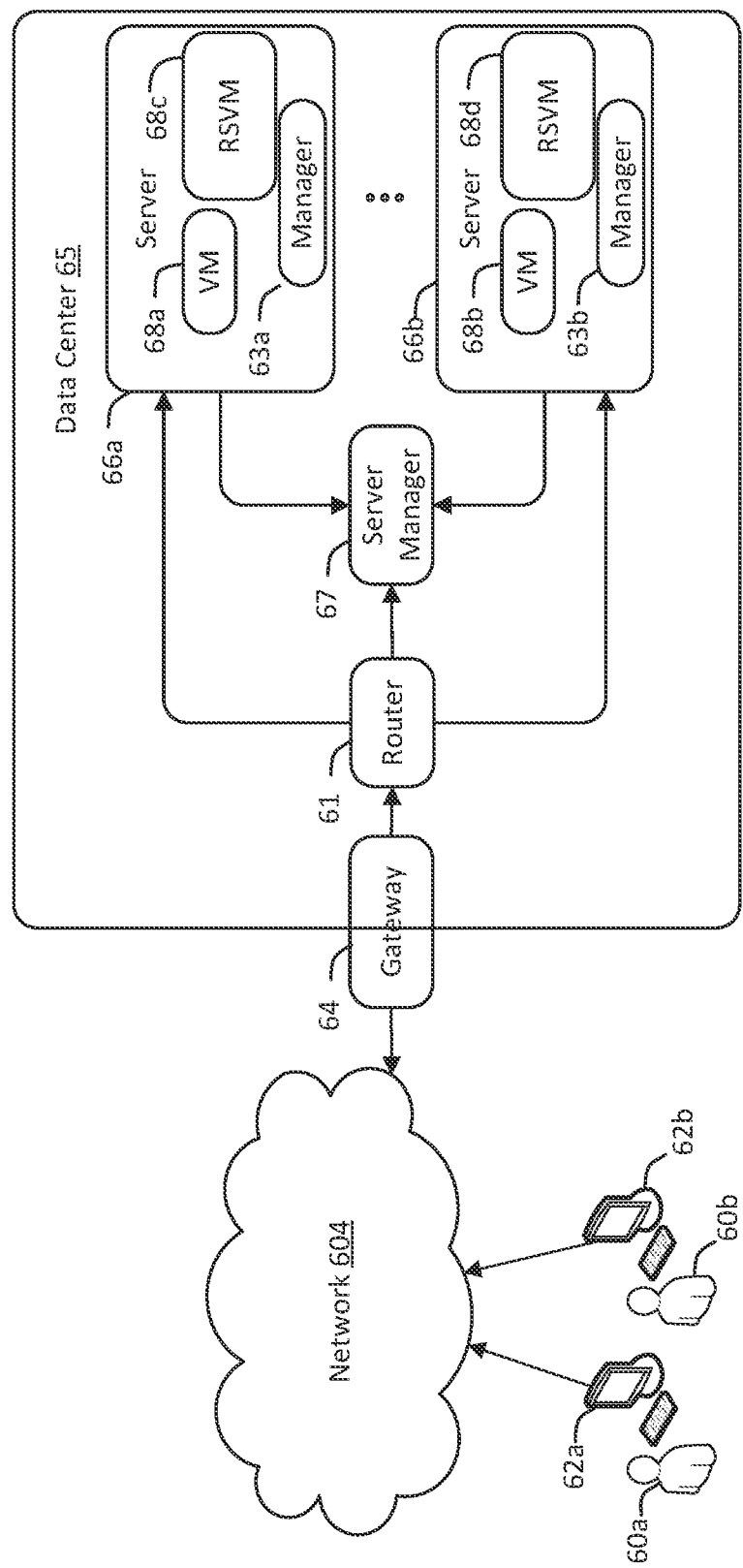
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 7:
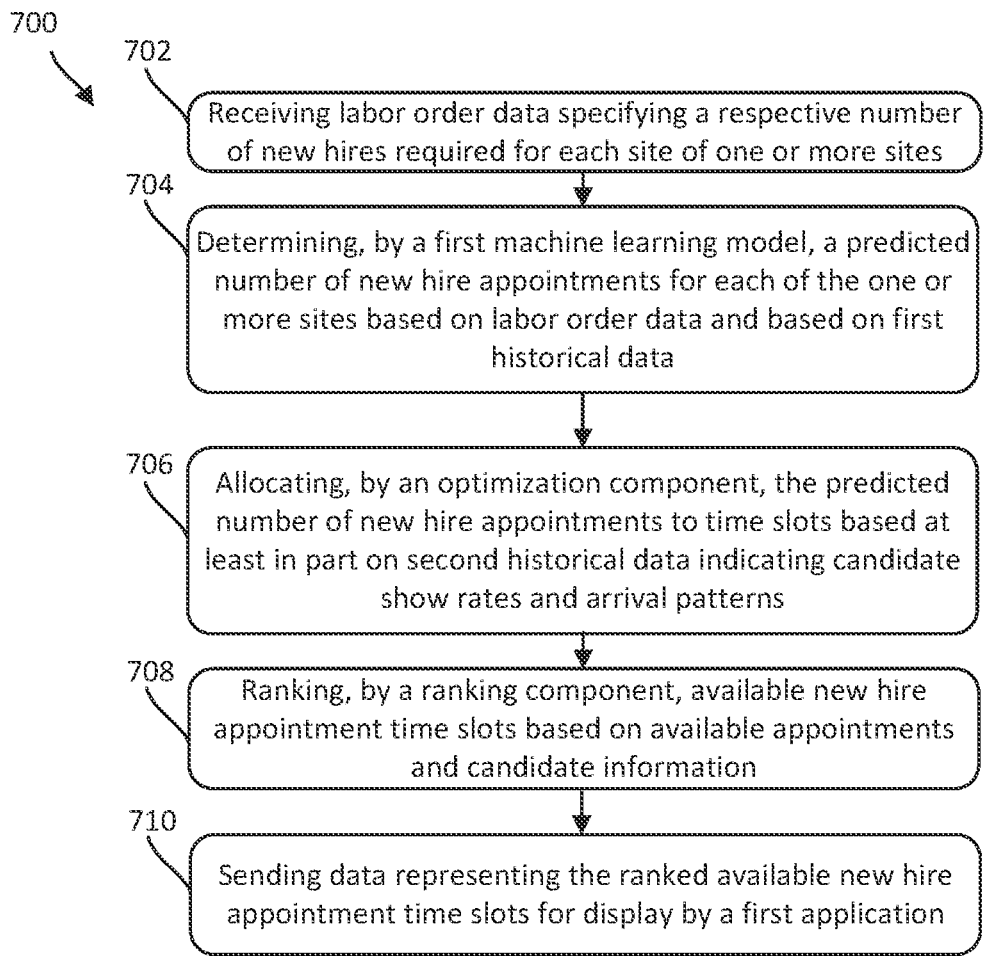
FIG. 7 is a flowchart illustrating an example process for onboarding optimization, in accordance with various examples described herein.

FIG. 7 is a flowchart illustrating an example process for onboarding optimization, in accordance with various examples described herein. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 702, at which labor order data specifying a respective number of new hires required for each site of one or more sites may be received. The labor order data may indicate the estimated number of new hires required at each site to meet the labor needs for a given, upcoming time period. The labor order data may be relevant to a particular node which may include at least one site. In various examples, the node may correspond to a particular geographic region that may include at least one work site that is grouped together as part of the node.

Processing may continue at action 704, at which a first machine learning model may determine a predicted number of new hire appointments for each of the one or more sites based on labor order data and based on first historical data. At action 704, a first machine learning model such as the forecasting component 130 described herein may determine a predicted number of new hire appointments that should be made available for each site of the one or more sites of the node corresponding to the labor order data received at action 702. The first machine learning model may predict the number of new hire appointments for each site based on historical data indicating past labor order data, past numbers of new hire appointments offered, and past show rates for new hire appointments.

Processing may continue at action 706, at which an optimization component, such as optimization component 140, may allocate the predicted number of new hire appointments to time slots based at least in part on second historical data indicating candidate show rates and arrival patterns. In various examples, the second historical data may be site specific and/or node specific. The new hire appointments may be allocated to time slots based on past candidate preferences evident from past candidate show rates and arrival patterns.

Processing may continue at action 708, at which a ranking component, such as ranking component 150, may rank the available new hire appointment time slots, in a per-candidate fashion, based on available appointments and candidate information. For example, the new hire appointment time slots may be ranked for selection by candidates based on candidates explicitly expressed preferences, based on learned candidate preferences, based on candidate commute time, candidate information, etc.

Processing may continue at action 710, at which data representing the ranked available new hire appointment time slots may be sent for display by a companion application. In various examples, the companion application may be accessible by new hire candidates so that the new hire candidates may select available new hire appointment time slots from the companion application. Additionally, the companion application may keep track of which new hire appointment time slots have been filled and may send feedback data to system 100 regarding fulfillment of new hire appointment time slots, the order in which the new hire appointment time slots were filled, etc., so that the various machine learning models described herein may be retrained using such data.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving labor order data specifying a target number of new hires;
   determining annotated training data comprising a target number of new hires, first candidate fallout data, first seasonality data, and first incentive data, wherein the annotated training data is annotated with a first number of new hire appointments;
   determining, for the annotated training data by inputting the target number of new hires, the first candidate fallout data, the first seasonality data, and the first incentive data into a first machine learning model comprising a neural network, a prediction of a second number of new hire appointments;
   determining a gradient using a difference between the first number of new hire appointments and the second number of new hire appointments;
   updating weights of the neural network using the gradient to generate a first trained machine learning model;
   predicting, by the first trained machine learning model, a third number of new hire appointments to offer based at least in part on the labor order data, historical candidate fallout data, seasonality effects, and incentives offered;
   allocating the third number of new hire appointments to respective time slots based at least in part on candidate preferences, geographical practices, weather condition data, historical candidate arrival pattern data, and the third number of new hire appointments predicted by the first trained machine learning model, wherein the third number of new hire appointments are allocated to respective time slots using a combination of mathematical models; and
   sending data to a first application effective to display a list of available new hire appointment time slots of the respective time slots.

2. The method of claim 1, wherein:
   the labor order data comprises first site data indicating a first number of target new hires for a first site and second site data indicating a second number of target new hires for a second site; and
   the predicting, by the first trained machine learning model, the third number of new hire appointments further comprises predicting, a fourth number of new hire appointments for the first site based at least in part on historical appointment data for the first site and a fifth number of new hire appointments for the second site based at least in part on historical appointment data for the second site.

3. The method of claim 1, further comprising:
   receiving, by the first trained machine learning model, historical data comprising:
      past labor order data indicating a past target number of new hires; and
      appointment data indicating past appointments associated with the past labor order data that were kept and past appointments associated with the past labor order data that were missed.

4. The method of claim 1, further comprising receiving past arrival pattern data for a past labor order, the past arrival pattern data indicating past candidate selections of past new hire appointments, wherein the allocating the third number of new hire appointments to respective time slots is further based at least in part on the past arrival pattern data.

5. The method of claim 1, further comprising generating a number of recruitment centers to open for serving the new hire appointments.

6. The method of claim 5, further comprising:
   receiving a schedule pertaining to new hire appointment coordinators; and
   allocating the third number of new hire appointments to the respective time slots further based at least in part on the schedule.

7. The method of claim 1, further comprising ranking, by a ranking component, the list of available new hire appointment time slots based at least in part on candidate-specified preferences.

8. The method of claim 1, further comprising:
   receiving, from a first candidate, a selection of a first site at which to attend a first new hire appointment;
   receiving, from the first candidate, commute data indicating a commute time for the first candidate; and ranking, by a ranking component, the list of available new hire appointment time slots for the first candidate based at least in part on the selection of the first site and the commute data.

9. The method of claim 1, wherein an optimization component solves an optimization problem that maximizes new hire candidate show rates for the third number of new hire appointments predicted by the first trained machine learning model.

10. A system comprising:
at least one processor; and
non-transitory computer-readable memory storing instructions that, when executed by the at least one processor, are effective to:
receive labor order data specifying a target number of new hires;
determine annotated training data comprising a target number of new hires, first candidate fallout data, first seasonality data, and first incentive data, wherein the annotated training data is annotated with a first number of new hire appointments;
determine, for the annotated training data by inputting the target number of new hires, the first candidate fallout data, the first seasonality data, and the first incentive data into a first machine learning model comprising a neural network, a prediction of a second number of new hire appointments;
determine a gradient using a difference between the first number of new hire appointments and the second number of new hire appointments;
update weights of the neural network using the gradient to generate a first trained machine learning model;
predict, by the first trained machine learning model, a third number of new hire appointments to offer based at least in part on the labor order data and based at least in part on historical candidate fallout data;
allocate the third number of new hire appointments to respective time slots based at least in part on candidate preferences, historical candidate arrival pattern data, and the third number of new hire appointments predicted by the first trained machine learning model, wherein the third number of new hire appointments are allocated to respective time slots by solving an optimization problem; and
send data to a first application effective to display a list of available new hire appointment time slots of the respective time slots.

11. The system of claim 10, wherein:
the labor order data comprises first site data indicating a first number of target new hires for a first site and second site data indicating a second number of target new hires for a second site; and
the predicting, by the first trained machine learning model, the third number of new hire appointments further comprises predicting, a fourth number of new hire appointments for the first site based at least in part on historical appointment data for the first site and a fifth number of new hire appointments for the second site based at least in part on historical appointment data for the second site.

12. The system of claim 10, the non-transitory computer-readable memory storing further instructions that, when executed by the at least one processor, are further effective to:
receive, by the first trained machine learning model, historical data comprising:
past labor order data indicating a past target number of new hires; and
appointment data indicating past appointments associated with the past labor order data that were kept and past appointments associated with the past labor order data that were missed.

13. The system of claim 10, the non-transitory computer-readable memory storing further instructions that, when executed by the at least one processor, are further effective to:
receive past arrival pattern data for a past labor order, the past arrival pattern data indicating past candidate selections of past new hire appointments, wherein the allocating the third number of new hire appointments to respective time slots is further based at least in part on the past arrival pattern data.

14. The system of claim 10, the non-transitory computer-readable memory storing further instructions that, when executed by the at least one processor, are further effective to:
Generate a number of recruitment centers to open for serving the new hire appointments.

15. The system of claim 14, the non-transitory computer-readable memory storing further instructions that, when executed by the at least one processor, are further effective to:
receive a schedule pertaining to new hire appointment coordinators; and
allocate the third number of new hire appointments to the respective time slots further based at least in part on the schedule.

16. The system of claim 10, the non-transitory computer-readable memory storing further instructions that, when executed by the at least one processor, are further effective to:
rank, by a ranking component, the list of available new hire appointment time slots based at least in part on candidate-specified preferences.

17. The system of claim 10, the non-transitory computer-readable memory storing further instructions that, when executed by the at least one processor, are further effective to:
receive, from a first candidate, a selection of a first site at which to attend a first new hire appointment;
receive, from the first candidate, commute data indicating a commute time for the first candidate; and
rank, by a ranking component, the list of available new hire appointment time slots for the first candidate based at least in part on the selection of the first site and the commute data.

18. A method comprising:
receiving labor order data specifying a target number of new hires, wherein the labor order data comprises first site data indicating a first number of target new hires for a first site and second site data indicating a second number of target new hires for a second site;
determining annotated training data comprising a target number of new hires, first candidate fallout data, first seasonality data, and first incentive data, wherein the annotated training data is annotated with a first number of new hire appointments;
determining, for the annotated training data by inputting the target number of new hires, the first candidate fallout data, the first seasonality data, and the first incentive data into a first machine learning model comprising a neural network, a prediction of a second number of new hire appointments;
determining a gradient using a difference between the first number of new hire appointments and the second number of new hire appointments;
updating weights of the neural network using the gradient to generate a first trained machine learning model;
predicting, by the first trained machine learning model, a third number of new hire appointments to offer based at least in part on the labor order data, historical candidate fallout data, seasonality effects, and incentives offered;

allocating the third number of new hire appointments to respective time slots based at least in part on candidate preferences; and sending data to a first application effective to display a list of available new hire appointment time slots of the respective time slots.

19. The method of claim 18, wherein the predicting, by the first trained machine learning model, the third number of new hire appointments further comprises predicting a fourth number of new hire appointments for the first site based at least in part on historical appointment data for the first site and a fifth number of new hire appointments for the second site based at least in part on historical appointment data for the second site.

20. The method of claim 18, receiving, by the first trained machine learning model, historical data comprising:
   past labor order data indicating a past target number of new hires; and
   appointment data indicating past appointments associated with the past labor order data that were kept and past appointments associated with the past labor order data that were missed.

\* \* \* \* \*